Jan. 30, 1940.  I. E. McCABE  2,188,555
SAFETY DEVICE FOR ELECTRICALLY CONTROLLED APPARATUS
Filed Jan. 3, 1938   3 Sheets-Sheet 1

INVENTOR.
IRA E. McCABE
BY
ATTORNEY.

Jan. 30, 1940.                I. E. McCABE                2,188,555
         SAFETY DEVICE FOR ELECTRICALLY CONTROLLED APPARATUS
                 Filed Jan. 3, 1938         3 Sheets-Sheet 2

INVENTOR.
IRA E. McCABE

BY Langdon Moon
ATTORNEY.

Jan. 30, 1940.   I. E. McCABE   2,188,555
SAFETY DEVICE FOR ELECTRICALLY CONTROLLED APPARATUS
Filed Jan. 3, 1938   3 Sheets-Sheet 3

INVENTOR.
IRA E. McCABE
BY Langdon Moore
ATTORNEY.

Patented Jan. 30, 1940

2,188,555

UNITED STATES PATENT OFFICE 2,188,555

SAFETY DEVICE FOR ELECTRICALLY CONTROLLED APPARATUS

Ira E. McCabe, Chicago, Ill.

Application January 3, 1938, Serial No. 182,975

6 Claims. (Cl. 158—28)

This invention relates to safety devices for electrically controlled apparatus and more particularly to a novel safety device for apparatus controlled through relays or other electrically actuated devices interposed between controls therefor and the apparatus to be controlled. When controlling apparatus in this manner, it is sometimes desirable to employ a low voltage circuit for operating the relay. In such cases it is desired, and in most jurisdictions required, to provide means to open the primary circuit, that is the circuit to the controlled apparatus in the event the relay should fail to do so normally in response to the controls in the low voltage or secondary circuit calling for such action.

An example of such an arrangement is found in connection with the control of gas burners, oil burners or coal stokers where it is customary, when the control devices and mechanism controlling the normal operation of the burner are in a low voltage control circuit, to employ an instrument, usually called a boiler control, connected in the main circuit between the source of electricity and the motor for supplying fuel. The boiler control includes a switch in this circuit which is normally closed and the instrument is responsive to excessive pressure in steam heating systems and excessive temperatures in hot water and hot air systems so that when the internal condition within the boiler or furnace becomes hazardous the electric circuit will be broken.

The boiler control operates to open the circuit whenever the temperature or pressure within the boiler reaches a certain predetermined high degree and thereafter to close the circuit when the temperature or pressure has descended to a predetermined low degree, irrespective of the operation of the other controls in the low voltage circuit.

It is an object of this invention to provide a safety device, that may be associated with, or form a part of, a relay or electrically actuated mechanism interposed between the control devices and controlled apparatus which will permit the use of all controlling devices in a low voltage or secondary circuit for operating the relay and which safety device will operate to open the main or primary circuit to the controlled apparatus in the even that the relay should fail to normally stop operation of the apparatus when any or all of the low voltage controlling devices call for such action, and to prevent further operation of the apparatus until the safety device is manually reset.

With these objects in view, reference is made to the accompanying sheets of drawing which illustrate a preferred form of this invention with the understanding that detail changes may be made without departing from the scope thereof.

Figure 1:
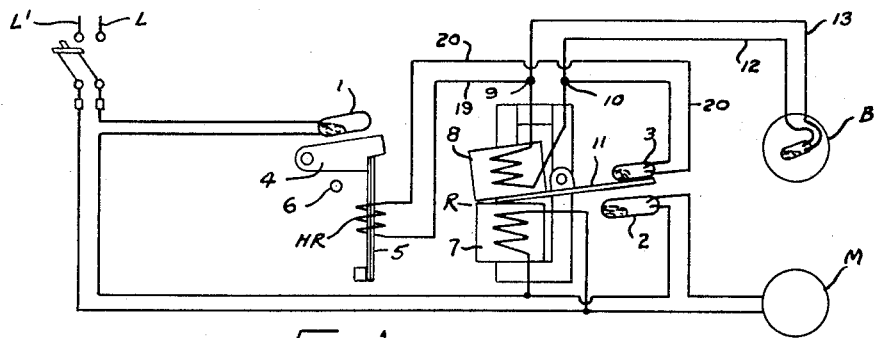
Figure 1 is a schematic drawing showing an embodiment of a simple form of this invention including a transformer repulsion relay in which the various parts and switches are shown in the normal idle position.

The embodiment of this invention in its preferred form as shown in Figure 1 employs three switches, i. e., a safety switch I, a relay or motor switch 2 and a safety heater switch 3. A motor or other controlled apparatus M is connected to the switch 2 to be controlled thereby. The operation of the motor is normally controlled by a remote control B which operates the relay R for opening and closing the motor switch 2.

Figure 2:
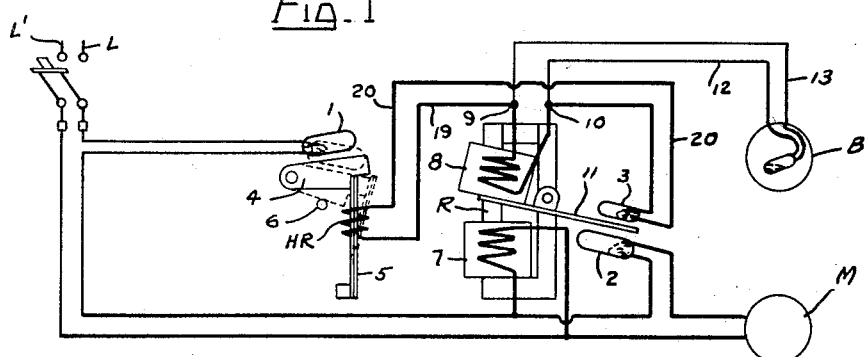
Figure 2 is a view similar to Figure 1, illustrating in heavy lines the circuit established to operate the safety device in the event the control in the control circuit has been operated to open the controlled circuit and the relay has failed to open the controlled circuit.

As shown in Figures 1 and 2 this invention contemplates the location of a safety switch 1 connected in series with the commercial line L—L' between the motor and source, for operating the motor M. The safety switch 1 is normally maintained in the closed position by a pivoted support 4 having its free end in engagement with an operating member 5 composed of bi-metallic metal. An electrical resistance heating element is arranged in operative relation to the actuating strip whereby upon energization of the heating element the actuator strip will be deformed to cause its free end to disengage the plate and allow it to drop until its under side engages a stop 6 and opens the circuit through the safety switch 1.

As is customary in many devices of this kind, the relay R is of the transformer repulsion type in which the windings of the primary coil 7 of the repulsion relay R are connected across the leads L—L' of the commercial line. The windings of the secondary movable coil 8 of the repulsion relay are connected to binding post 9 and 10. When a circuit is closed through the secondary coil, the coil 8 is repelled. The coil 8 is carried on a pivoted arm 11 which mounts the motor switch 2 and an additional heater switch 3 in such a manner that the switches are normally opened when the coil 8 is de-energized and rests upon the coil 7 and when the coil 8 is repelled the switches 2 and 3 are closed.

When the parts are in the idle position, as illustrated in Figure 1, and the remote control B closes a circuit is established between the secondary coil 8, binding post 10, wire 12 to the control B, wire 13 from the control to the binding post 9 and thence back to the secondary coil. Upon closing this circuit the coil 8 is repelled, which closes the motor circuit through switch 2.

The switch 3 also closes with the closing of the motor switch 2 but the greater part of the current through the heater circuit is shunted out by the circuit controlled through the control B so that the heater is rendered inoperative and the coil 8 remains in the repelled position as long as the control circuit is closed. When the control B opens, the resistance HR limits the current through the circuit established by the switch 3 in the closed position so that the relay coil 8 is not sufficiently energized to remain unrestrained in the repelled position and normally returns the switches 2 and 3 to the open position. In the event the control B is opened, and for any reason the coil 8 fails to fall and open switches 2 and 3, then a circuit is established between the secondary coil 8, binding post 9, wire 19, heating coil HR, wire 20, switch 3, wire 21 to binding post 10 and back to coil 8, as shown in heavy lines in Figure 2 and the safety switch 1 is thereafter opened.

Figure 3:
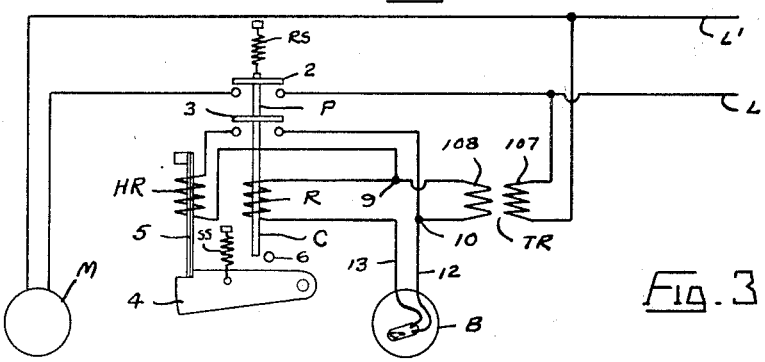
Figure 3 is a view similar to Figure 1 showing another type of means for operating the switch in the controlled circuit to the apparatus.
Figure 4:
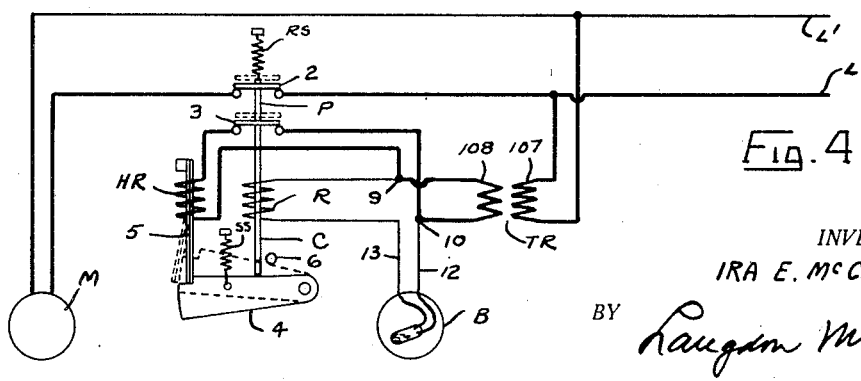
Figure 4 is a view similar to Figure 2 of the parts and circuits shown in Figure 3.

Figures 3 and 4 illustrate the application of this invention in the same type of circuit but in which a solenoid operated switch is employed in place of the transformer relay. In such a case, the primary winding 107 of the transformer TR is connected across the commercial lines L—L' and secondary winding 108 of the transformer is connected to binding posts 9 and 10. The blades of the switches 2 and 3 are mounted upon a common post P extending from and secured to the core C of the solenoid. The windings of the solenoid are connected to binding posts 9 and 10 through the remote control B. The switches 2 and 3 are normally held open by the spring RS and are closed by the action of the solenoid when the control B closes to establish a secondary circuit and the bottom of the core C rests upon the support 4 as shown in Figure 4.

In the event the control B opens and should, for any reason, the switches 2 and 3 be prevented from opening, a circuit is established as shown in the heavy lines in Figure 4, through the resistance heater HR. In this case the support 4 is under the influence of a spring SS which when the support 4 is released will cause it to open the switches 2 and 3.

In the embodiment illustrated in Figures 5 to 9 inclusive, a conventional boiler or furnace F is shown to which is connected a commercial oil burner OB having a motor M and a stack S leading from the furnace to the chimney. The normal operation of the oil burner is controlled by a commercial room thermostat T cooperating with a repulsion relay R for opening and closing a motor switch 2 and a safety device cooperating with a commercial stack switch SW is employed for shutting down the burner when abnormal hazardous conditions arise during periods the room thermostat calls for heat.

The remote control B is a commercial boiler control and is shown mounted upon the heater 1. It is customary to connect the boiler control in circuit between the source and motor. This invention contemplates the adaptation of the embodiment disclosed in Figures 1 and 2 to a safety device such as employed in oil burner control systems for the purpose set forth in the preceding paragraph so that all the burner control devices, including the boiler control, may be interposed in a low voltage circuit controlling the operation of the burner. The safety switch 1 is connected in series with the commercial line L—L' between the motor and source for operating the motor M. The safety switch 1 is normally maintained in the closed position by a pivoted support 4 having its free end in engagement with an operating member 5 composed of bi-metallic metal, as heretofore described. Two electrical resistance heating elements are arranged in operative relation to the actuating strip whereby upon energization of either or both of the heating elements the actuator strip will be deformed to cause its free end to disengage the plate and allow it to drop until its underside engages a stop 6 and opens the circuit through the safety switch 1. It is preferable to construct the electrical heating coil HR of higher resistance than the heating coil LR.

The repulsion relay is of the type shown in Figure 1 having the windings of the primary coil 7 connected across the leads L—L' of the commercial line. The windings of the secondary movable coil 8 of the repulsion relay are connected to binding posts 9 and 10. When a circuit is closed through the secondary coil, the coil 8 is repelled. The coil 8 is carried on a pivoted arm 11 which mounts the motor switch 2 and the heater switch 3 in such a manner that the switches are normally opened when the coil 8 is de-energized and rests upon the coil 7 and when the coil 8 is repelled the switches 2 and 3 are closed.

Figure 5:
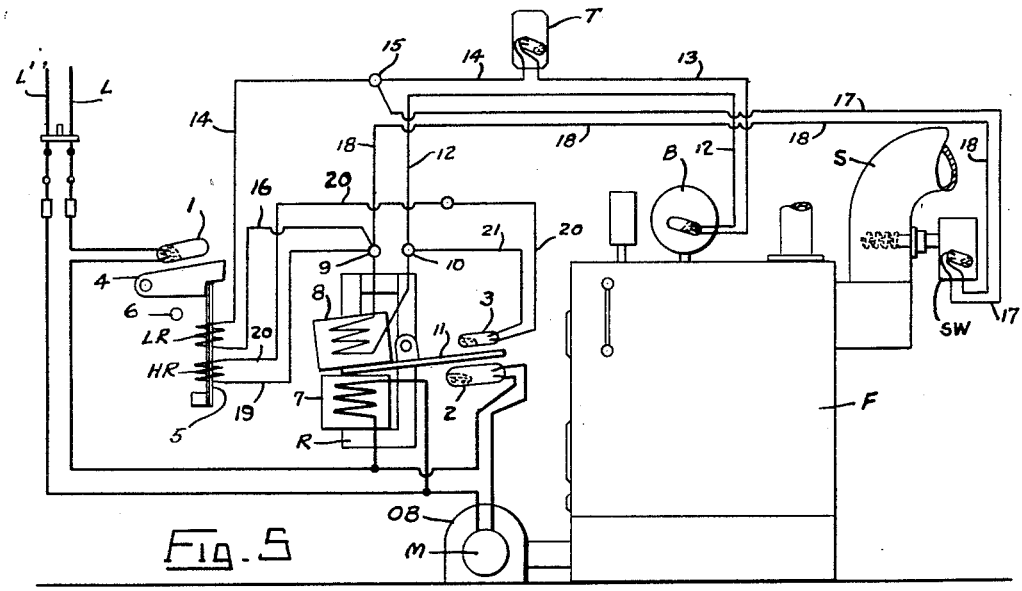
Figure 5 is a schematic drawing showing a conventional type of furnace with an oil burner installed therewith and the wiring diagram of a commercial type of control therefor, and a wiring diagram of this improved apparatus. The various parts and switches in this view are shown in the normal idle position.
Figure 6:
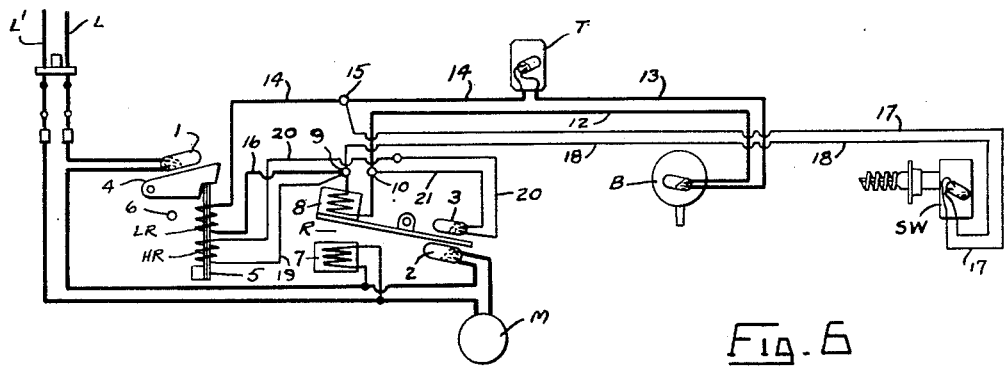
Figure 6 is a wiring diagram similar to Figure 5, illustrating in heavy lines the circuit normally closed when the room thermostat calls for heat and the burner mechanism is started.

When the parts are in the idle position, as illustrated in Figure 5, and the room thermostat T closes in response to a call for heat, a circuit is established, as shown in Figure 6, between the secondary coil 8, binding post 10, wire 12 to boiler control B, wire 13 from the boiler control to the room thermostat T and from the thermostat by wire 14 through binding post 15 to one end of the windings of the low resistance heating coil LR and from there by wire 16 to the binding post 9 and thence back to the secondary coil. Upon closing this circuit the coil 8 is repelled, which closes the motor circuit through switch 2.

Figure 7:
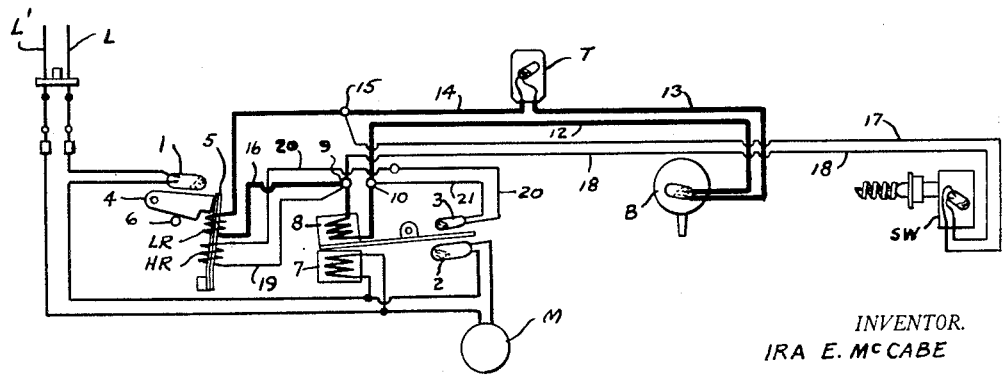
Figure 7 is a similar wiring diagram showing in heavy lines the circuit established when ignition fails to occur within the predetermined time to open the safety control.
Figure 8:
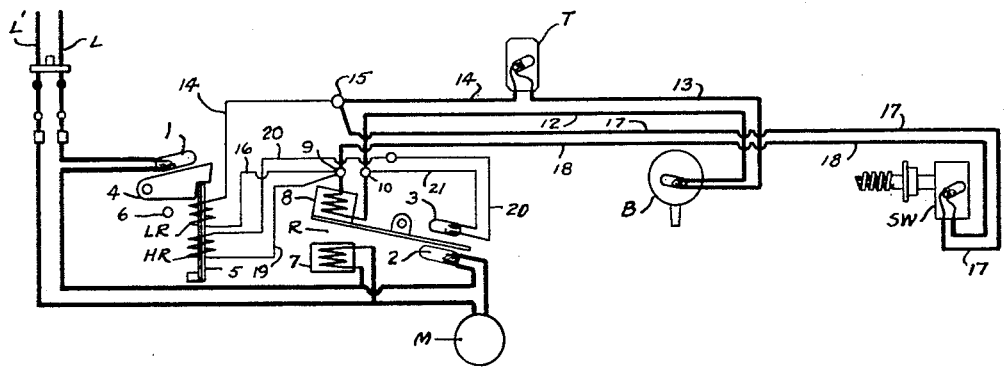
Figure 8 is a similar view illustrating in heavy lines the circuit established under normal conditions for the continued operation of the burner mechanism.

If combustion does not occur within a predetermined time, the continued passage of the current through the heating element LR will deform the actuating strip 5 and release the safety switch to open the circuit to cause a complete shut down, as shown in Figure 7.

A commercial switch responsive to combustion conditions SW is mounted in the stack S which will close within a predetermined time after the establishment of combustion. The stack switch SW is connected by wire 17 to the binding post 15 and by wire 18 to the binding post 9 so that if combustion occurs before the safety switch 1 is opened the heating element LR is shunted out, as shown by heavy lines in Figure 8. This is the normal running position and when the call for heat is satisfied, the opening of the room thermostat opens this circuit so that the secondary coil 8 becomes de-energized and descends upon the stationary coil 7 and opens the motor circuit through switch 2. The stack switch then cools and returns to open position and the control is ready to operate the burner mechanism again on another call for heat.

If during normal operation temperature or pressure conditions within the furnace become hazardous, the boiler control will open the circuit through the room thermostat and when the hazardous conditions have ceased to exist, the boiler control will again close the circuit and if the room thermostat is still calling for heat the operation will be reassumed.

Figure 9:
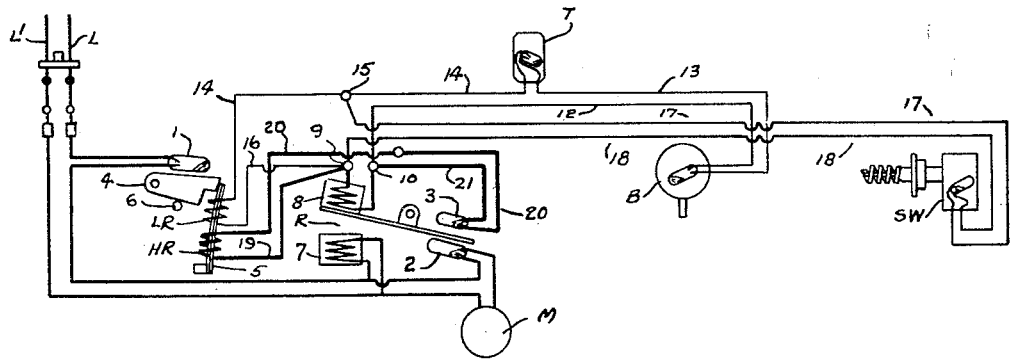
Figure 9 is a similar wiring diagram illustrating in heavy lines the circuit established to operate the safety mechanism when the mechanism cooperating with the room thermostat fails to open the motor circuit.

In the event that the call for heat is satisfied and the room thermostat T opens and for any reason the secondary coil 8 fails to fall to open the motor circuit, a circuit is then established, as shown in Figure 9. This circuit passes from the secondary coil 8 through binding post 9, wire 19, heating element HR, wire 20, through heater switch 3, wire 21, binding post 10 and back to coil 8. In this manner the heating element HR deforms the actuator strip 5 and allows the safety switch 1 to open. As previously described the greater part of the current through the heater circuit is shunted out when the thermostat circuit is closed. The resistance of the heat coil limits the current through the coil 8 to the extent that the coil normally falls to the idle position when the control circuit is opened and it is only when the room thermostat or boiler control is opened with the heater switch 3 closed that the secondary circuit will flow through the heating coil HR.

From the above it is seen that only the safety switch 1, the windings of the primary coil 7 of the repulsion relay and the motor switch 2 are the only electrical instrumentalities interposed in the commercial electric circuit between the source of current and the burner mechanism motor for supplying fuel while the switch T responsive to room temperature, the switch B responsive to boiler or furnace conditions and the switch SW responsive to combustion conditions as well as the heater switch 3 for starting and stopping the operation of the burner mechanism as well as causing a shut down when abnormal or dangerous conditions occur are all in the secondary circuit. The advantage of connecting the boiler or furnace switch in the manner shown in the secondary circuit over the usual connection in the primary circuit is that in the usual connection, that is between the source and motor, whenever the pressure or temperature within the boiler or furnace reaches a high degree to be dangerous the circuit is broken, but as soon as the internal conditions of the boiler or furnace return to normal the circuit is closed, so that a condition may exist where means, normally responsive to the thermostat when open, fail to shut down the burner whereupon the burner is operated by the boiler control, while in the arrangement disclosed herein in the event that means for normally opening the motor switch should fail the safety switch 1 will be operated to stop the burner and must thereafter be reset by hand before normal operation can be resumed.

The switch SW as shown is illustrative of one type of device commonly used for the purpose disclosed herein but light or flame responsive devices or other types answering the requirements for such devices may also be used.

What I claim is:

1. An electrically actuated safety device for electrically operated and controlled mechanisms comprising in combination, a circuit for said mechanism including an electrically operated control switch, a low voltage operating circuit having a source of supply and operating means for the control switch and an operating control in the low voltage circuit for controlling the operation of said means, an electrically actuated circuit breaker for the controlled circuit and a switch in circuit with the actuator of the circuit breaker arranged for associated operation with the control switch to close therewith, said circuit breaker actuator circuit so interposed in the low voltage operating circuit that it is shunted upon closure of the circuit through the operating control and energized upon opening of said circuit and the circuit breaker actuator switch remaining closed.

2. An electrically actuated safety device for electrically operated and controlled mechanisms comprising in combination, a circuit for said mechanism including an electrically operated control switch, a low voltage operating circuit having a source of supply and operating means for the control switch and an operating control in the low voltage circuit for controlling the operation of said means, an electric resistance element and means operable thereby to open the controlled circuit, a switch in circuit therewith arranged for associated operation with the control switch to close therewith, said resistance circuit so interposed in the low voltage operating circuit that it is shunted upon closure of the circuit through the operating control and energized upon opening of said circuit and the resistance switch remaining closed.

3. An electrically actuated safety device for electrically operated and controlled mechanisms comprising in combination, a circuit for said mechanism including an electrically actuated cut out switch and an electrically operated control switch, a low voltage operating circuit having a source of supply and operating means for the control switch and an operating control in the low voltage circuit for controlling the operation of said means, an electric resistance cut out actuator of high resistance and a switch in circuit therewith arranged for associated operation with the control switch to close therewith, said resistance circuit so interposed in the operating circuit that it is shunted upon closure of the circuit through the low voltage operating control and energized upon opening of said circuit and the resistance switch remaining closed.

4. An electrically actuated safety device for electrically operated and controlled mechanisms comprising in combination a circuit for said mechanism including a safety switch movable manually to closed and automatically to open position and an electrically operated control switch for normally opening and closing said circuit, a low voltage operating circuit having a source of supply and operating means for the control switch and an operating control in the low voltage circuit for controlling the operation of said means, an electric resistance element and a thermostatic element in association with the resistance element for opening said safety switch, a switch in circuit with said element arranged for associated operation with the control switch to close therewith, said element circuit so interposed in the operating circuit that it is shunted upon closure of the circuit through the low voltage operating control and energized upon opening of said circuit and the resistance switch remaining closed.

5. An electrically actuated safety device for fluid fuel burning mechanisms having electrically operated means for controlling the fuel feed comprising in combination, a circuit for said means including a safety switch movable manually to closed and automatically to open position and an electrically operated control switch for normally opening and closing the said circuit, a low voltage operating circuit having a source of supply and operating means for the control switch and an operating control in the low voltage circuit responsive to heat conditions resulting from operation of the burner to limit the periods of operation, an electric resistance safety switch actuator of high resistance and a switch in circuit therewith arranged for associated operation with the control switch to close therewith, said resistance circuit so interposed in the low voltage operating circuit that it is shunted upon closure of the circuit through the operating control and energized upon opening of said circuit and the resistance switch remaining closed.

6. The structure of claim 1, wherein the low voltage operating circuit having a source of supply and operating means consists of a transformer having relatively movable coils, and tilting means for the control switch in the low voltage circuit having an operative connection with one of said coils to be normally actuated thereby upon energization of the transformer.

IRA E. McCABE.